(12) United States Patent
Lai et al.

(10) Patent No.: US 11,287,261 B2
(45) Date of Patent: Mar. 29, 2022

(54) METHOD AND APPARATUS FOR CONTROLLING UNMANNED AERIAL VEHICLE

(71) Applicant: SZ DJI TECHNOLOGY CO., LTD., Shenzhen (CN)

(72) Inventors: Zhenzhou Lai, Shenzhen (CN); Jianyu Song, Shenzhen (CN); Zhaoliang Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 153 days.

(21) Appl. No.: 16/590,876

(22) Filed: Oct. 2, 2019

(65) Prior Publication Data

US 2020/0064135 A1    Feb. 27, 2020

Related U.S. Application Data

(63) Continuation of application No. PCT/CN2017/085993, filed on May 25, 2017.

(51) Int. Cl.
| | |
|---|---|
| *G01C 21/16* | (2006.01) |
| *B64C 39/02* | (2006.01) |
| *G01C 21/20* | (2006.01) |
| *G05D 1/10* | (2006.01) |

(52) U.S. Cl.
CPC .............. *G01C 21/16* (2013.01); *B64C 39/02* (2013.01); *G01C 21/20* (2013.01); *G05D 1/101* (2013.01); *B64C 2201/127* (2013.01); *B64C 2201/145* (2013.01)

(58) Field of Classification Search
CPC ........ G01C 21/16; G01C 21/20; G01C 21/00; G01C 23/00; G01C 21/165; B64C 39/02; B64C 2201/127; B64C 2201/145; B64C 19/00; G05D 1/101; G08G 5/0069
See application file for complete search history.

(56) References Cited

U.S. PATENT DOCUMENTS

| | | |
|---|---|---|
| 2013/0046430 A1 | 2/2013 | Bageshwar et al. |
| 2018/0120111 A1* | 5/2018 | Petillon ................ G05D 1/0825 |

FOREIGN PATENT DOCUMENTS

| | | |
|---|---|---|
| CN | 104199461 A | 12/2014 |
| CN | 104267736 A | 1/2015 |
| CN | 104535065 A | 4/2015 |
| CN | 105045281 A | 11/2015 |
| CN | 106705959 A | 5/2017 |
| WO | WO-2015/126678 A1 | 8/2015 |

OTHER PUBLICATIONS

Machine translation of CN 104535065 (Year: 2015).*
International Search Report from the State Intellectual Property Office of the P.R. China for International Application No. PCT/CN2017/085993, dated Feb. 12, 2018 (5 pages).

* cited by examiner

*Primary Examiner* — Rodney A Butler
(74) *Attorney, Agent, or Firm* — Finnegan, Henderson, Farabow, Garrett & Dunner, LLP

(57) ABSTRACT

A method for controlling a movable object is described. The method may include controlling the movable object to move with a variable speed along one or more directions; collecting sensing data from one or more sensors onboard the movable object during the movement along the one or more directions, wherein the one or more sensors do not include a magnetic sensor; and determining a correspondence between a local coordinate system and a global coordinate system based on the sensing data.

20 Claims, 10 Drawing Sheets

METHOD AND APPARATUS FOR CONTROLLING UNMANNED AERIAL VEHICLE

CROSS-REFERENCE TO RELATED PATENT APPLICATIONS

This application is a continuation of International Application No. PCT/CN2017/085993, filed May 25, 2017, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to a control method of an unmanned aerial vehicle (UAV) and, more particularly, to a method and apparatus for controlling an UAV when the UAV is not provided with a magnetic sensor or a magnetic sensor on the UAV is malfunctioning.

BACKGROUND

Unmanned aerial vehicles ("UAV"), sometimes referred to as "drones," include pilotless aircraft of various sizes and configurations that can be remotely operated by a user and/or programmed for automated flight along a user-defined path or towards a user-defined target. The automated flight function relies on positioning information and heading information of the UAV to control the flight direction and flight speed of UAV. The positioning information may be obtained from a positioning device onboard the UAV, and the heading information may be obtained from a magnetic sensor (e.g., compass) onboard the UAV. However, when the magnetic sensor is malfunctioning due to, for example, disturbance from an external magnetic field, the magnetic sensor may not generate accurate information. In such case, the automated flight function may fail.

SUMMARY

It is therefore an object of the present invention to provide an automatic flight function that does not depend on the magnetic sensor, such that the UAV can fly along a user-defined path or towards a user-defined target by relying primarily on sensing data from positioning sensors and inertia sensors.

In one embodiment, the present disclosure relates to a method for controlling a movable object. The method may include: controlling the movable object to move with a variable speed along one or more directions; collecting sensing data from one or more sensors onboard the movable object during the movement along the one or more directions, wherein the one or more sensors do not include a magnetic sensor; and determining a correspondence between a local coordinate system and a global coordinate system based on the sensing data.

In another embodiment, the present disclosure relates to an unmanned aerial vehicle (UAV). The UAV may include one or more sensors configured to generate sensing data related to the UAV. The UAV may also include a memory storing instructions, and a controller including a processor configured to execute the instructions to: control the UAV to move with a variable speed along one or more directions; collect sensing data from the one or more sensors during the movement along the one or more directions, without collecting data from a magnetic sensor; and determine a correspondence between a local coordinate system and a global coordinate system based on the sensing data.

In yet another embodiment, the present disclosure relates to a system for controlling a movable object. The control system may include a memory having instructions stored therein. The control system may also include an electronic control unit having a processor configured to execute the instructions to: control the movable object to move with a variable speed along one or more directions; collect sensing data from one or more sensors onboard the movable object during the movement along the one or more directions, without collecting data from a magnetic sensor; and determine a correspondence between a local coordinate system and a global coordinate system based on the sensing data.

In yet another embodiment, the present disclosure relates to a non-transitory computer-readable medium storing instructions, that, when executed, cause a computer to perform a method of controlling a movable object. The method may include: controlling the movable object to move with a variable speed along one or more directions; collecting sensing data from one or more sensors onboard the movable object during the movement along the one or more directions, wherein the one or more sensors do not include a magnetic sensor; and determining a correspondence between a local coordinate system and a global coordinate system based on the sensing data.

In yet another embodiment, the present disclosure relates to a method for controlling a movable object. The method includes: determining a target flight direction from the movable object towards a target based on location coordinates of the movable object; determining a current flight direction of the movable object based on a change of the location coordinates over time; and adjusting the flight direction of the movable object based on the current flight direction and the target flight direction.

In yet another embodiment, the present disclosure relates to an unmanned aerial vehicle (UAV). The UAV includes one or more sensors configured to generate sensing data related to the UAV. The UAV also includes a memory storing instructions, and a controller comprising a processor configured to execute the instructions to: determine a target flight direction from the movable object towards a target based on the sensing data, the sensing data including location coordinates of the UAV; determine a current flight direction of the UAV based on a change of the location coordinates over time; and adjust the flight direction of the UAV based on the current flight direction and the target flight direction.

In yet another embodiment, the present disclosure relates to a system for controlling a movable object. The system includes a memory having instructions stored therein, and an electronic control unit having a processor configured to execute the instructions to: determine a target flight direction from the movable object towards a target based on location coordinates of the movable object; determine a current flight direction of the movable object based on a change of the location coordinates over time; and adjust the flight direction of the movable object based on the current flight direction and the target flight direction.

In yet another embodiment, the present disclosure relates to a non-transitory computer-readable medium storing instructions, that, when executed, cause a computer to perform a method of controlling a movable object. The method includes: determining a target flight direction from the movable object towards a target based on location coordinates of the movable object; determining a current flight direction of the movable object based on a change of the location coordinates over time; and adjusting the flight direction of the movable object based on the current flight direction and the target flight direction.

DETAILED DESCRIPTION

Figure 1:
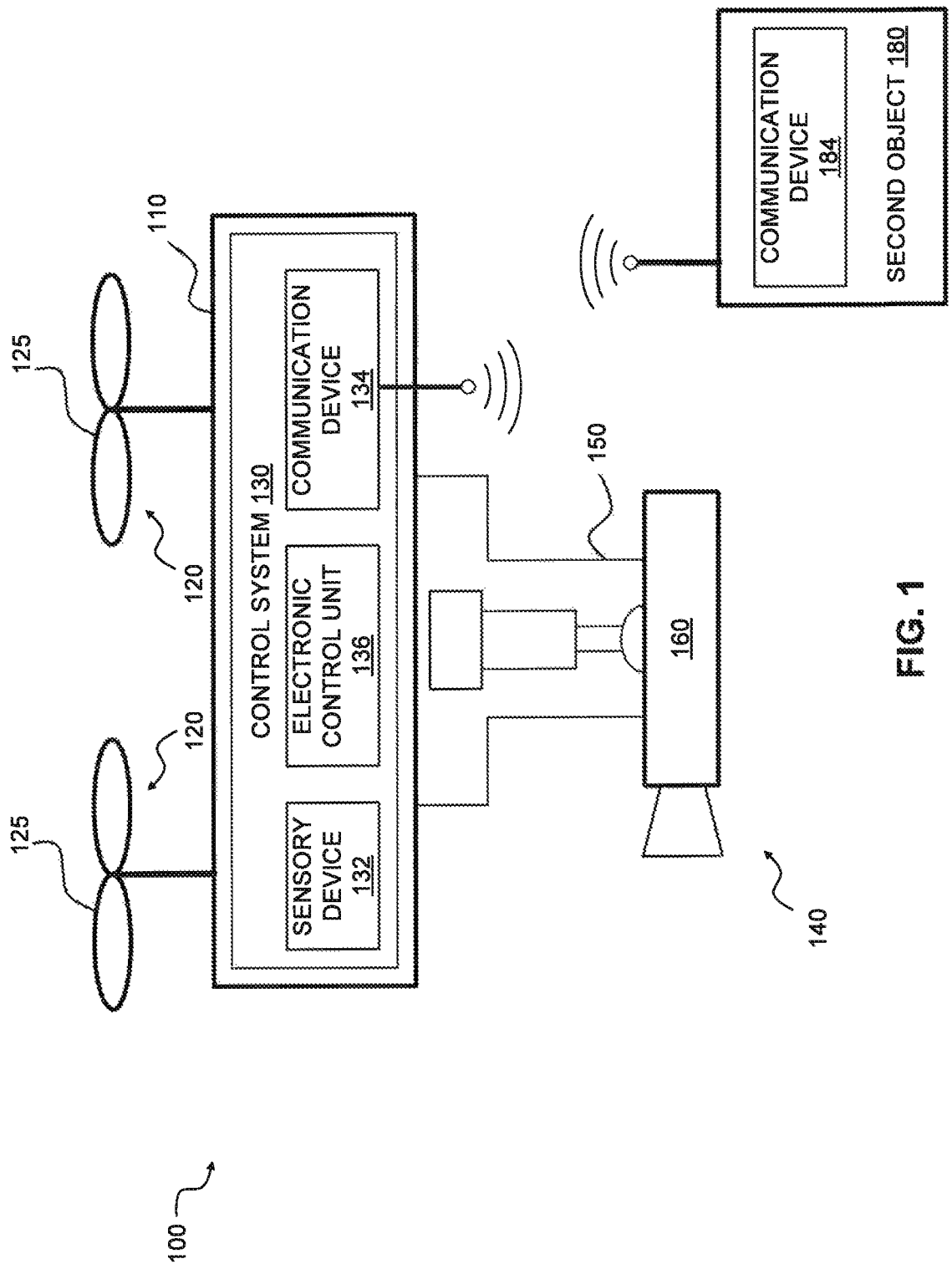
FIG. 1 shows an exemplary movable object that may be configured to move within an environment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is an exemplary movable object 100 that may be configured to move within an environment. Movable object 100 may be any suitable object, device, mechanism, system, or machine configured to travel on or within a suitable medium (e.g., a surface, air, water, one or more rails, space, underground, etc.). For example, movable object 100 may be an unmanned aerial vehicle (UAV). Although movable object 100 is shown and described herein as a UAV for exemplary purposes of this description, it is understood that other types of movable objects (e.g., wheeled objects, nautical objects, locomotive objects, other aerial objects, etc.) may also or alternatively be used in embodiments consistent with this disclosure. As used herein, the term UAV may refer to an aerial device configured to be operated and/or controlled automatically (e.g., via an electronic control system) and/or manually by off-board personnel.

Movable object 100 may include a housing 110, one or more propulsion assemblies 120, and a payload 140, such as a camera or video system. In some embodiments, as shown in FIG. 1, payload 140 may be connected or attached to housing 110 of movable object 100 by a carrier 150, which may allow for one or more degrees of relative movement between payload 140 and housing 110 of movable object 100. In other embodiments, payload 140 may be mounted directly to housing 110 without carrier 150.

Movable object 100 may also include a sensory device 132, a communication device 134, and an electronic control unit 136 in communication with the other components. In some embodiments, one or more sensory devices 132, communication device 134, and electronic control unit 136 may be included in a control system 130. Control system 130 may be configured to control multiple systems or functions of movable object 100. Alternatively, control system 130 may be dedicated to controlling a single system or subset of functions. For example, control system 130 may be or include a flight control system of a UAV.

Movable object 100 may include one or more propulsion assemblies 120 positioned at various locations (for example, top, sides, front, rear, and/or bottom of housing 110) for propelling and steering movable object 100. Although only two exemplary propulsion assemblies 120 are shown in FIG. 1, it will be appreciated that movable object 100 may include any number of propulsion assemblies (e.g., 1, 2, 3, 4, 5, 10, 15, 20, etc.). Propulsion assemblies 120 may be devices or systems operable to generate forces for sustaining controlled flight. Propulsion assemblies 120 may share or may each separately include at least one power source, such as one or more batteries, fuel cells, solar cells, etc., or combinations thereof. Each propulsion assembly 120 may also include one or more rotary components 125, e.g., within an electric motor, engine, or turbine, coupled to the power source and configured to participate in the generation of forces for sustaining controlled flight. For instance, rotary components 125 may include rotors, propellers, blades, etc., which may be driven on or by a shaft, axle, wheel, or other component or system configured to transfer power from the power source. Propulsion assemblies 120 and/or rotary components 125 may be adjustable (e.g., tiltable, foldable, collapsible) with respect to each other and/or with respect to housing 110 of movable object 100. Control system 130 may control the rotational speed and/or tilt angle of propulsion devices. Alternatively, propulsion assemblies 120 and rotary components 125 may have a fixed orientation with respect to each other and/or with respect to housing 110. In some embodiments, each propulsion assembly 120 may be of the same type. In other embodiments, propulsion assemblies 120 may be of multiple different types. In some embodiments, all propulsion assemblies 120 may be controlled in concert (e.g., all at the same speed and/or angle). In other embodiments, one or more propulsion assemblies 120 may be independently controlled with respect to, e.g., speed and/or angle.

Propulsion assemblies 120 may be configured to propel movable object 100 in one or more vertical and horizontal directions and/or to allow movable object 100 to rotate about one or more axes. That is, propulsion assemblies 120 may be configured to provide lift and/or thrust for creating and maintaining translational and rotational movements of movable object 100. For instance, propulsion assemblies 120 may be configured to enable movable object 100 to achieve and maintain desired altitudes, provide thrust for movement in all directions, and provide for steering of movable object 100. In some embodiments, propulsion assemblies 120 may enable movable object 100 to perform vertical takeoffs and landings (i.e., takeoff and landing without horizontal thrust). In other embodiments, movable object 100 may require constant minimum horizontal thrust to achieve and sustain flight. Propulsion assemblies 120 may be configured to enable movement of movable object 100 along and/or about multiple axes.

Payload 140 may include one or more sensory devices 160, such as the exemplary sensory device 160 shown in FIG. 1. Sensory devices 160 include devices for collecting or generating data or information, such as surveying, tracking, and capturing images or video of targets (e.g., objects, landscapes, subjects of photo or video shoots, etc.). Sensory devices 160 may include imaging devices configured to gathering data that may be used to generate images. For example, imaging devices may include photographic cameras (e.g., analog, digital, etc.), video cameras, infrared imaging devices, ultraviolet imaging devices, x-ray devices, ultrasonic imaging devices, radar devices, binocular cameras, etc. Sensory devices 160 may also or alternatively include devices for capturing audio data, such as microphones or ultrasound detectors. Sensory devices 160 may also or alternatively include other suitable sensors for capturing visual, audio, electromagnetic signals and/or positioning signals.

Carrier 150 may include one or more devices configured to hold the payload 140 and/or allow the payload 140 to be adjusted (e.g., rotated) with respect to housing 110 of movable object 100. For example, carrier 150 may be a gimbal. Carrier 150 may be configured to allow payload 140 to be rotated about one or more axes, as described below. In some embodiments, carrier 150 may be configured to allow 360° of rotation about each axis to allow for greater control of the perspective of payload 140. In other embodiments, carrier 150 may limit the range of rotation of payload 140 to less than 360° (e.g., ≤270°, ≤210°, ≤180, ≤120°, ≤90°, ≤45°, ≤30°, ≤15° etc.), about one or more of its axes.

Communication device 134 may be configured to enable communications of data, information, commands (e.g., flight commands, commands for operating payload 140, etc.), and/or other types of signals between electronic control unit 136 and off-board entities. Communication device 134 may include one or more components configured to send and/or receive signals, such as receivers, transmitters, or transceivers that are configured to carry out one- or two-way communication. Components of communication device 134 may be configured to communicate with off-board entities via one or more communication networks, such as networks configured for WLAN, radio, cellular (e.g., WCDMA, LTE, etc.), WiFi, RFID, etc., and using one or more wireless communication protocols (e.g., IEEE 802.15.1, IEEE 802.11, etc.), and/or other types of communication networks or protocols usable to transmit signals indicative of data, information, commands, control, and/or other signals. Communication device 134 may be configured to enable communications with user input devices, such as a control terminal (e.g., a remote control) or other stationary, mobile, or handheld control device, that provide user input for controlling movable object 100 during flight. For example, communication device 134 may be configured to communicate with a second object 180, which may be a user input device or any other device capable of receiving and/or transmitting signals with movable object 100.

Second object 180 may be a stationary device, mobile device, or other type of device configured to communicate with movable object 100 via communication device 134. For example, in some embodiments, second object 180 may be another movable device (e.g., another UAV), a computer, a terminal, a user input device (e.g., a remote control device), etc. Second object 180 may include a communication device 184 configured to enable wireless communication with movable object 100 (e.g., with communication device 134) or other objects. Communication device 184 of second object 180 may be configured to receive or exchange data and information from communication device 134 of movable object 100, such as operational data relating to, for example, positional data, velocity data, acceleration data, sensory data (e.g., imaging data), and other data and information relating to movable object 100, its components, and/or its surrounding environment. In some embodiments, second object 180 may include control features, such as levers, buttons, touch screen device, displays, etc. In some embodiments, second object 180 may embody an electronic communication device, such as a smartphone or a tablet, with virtual control features (e.g., graphical user interfaces, applications, etc.).

Figure 2:
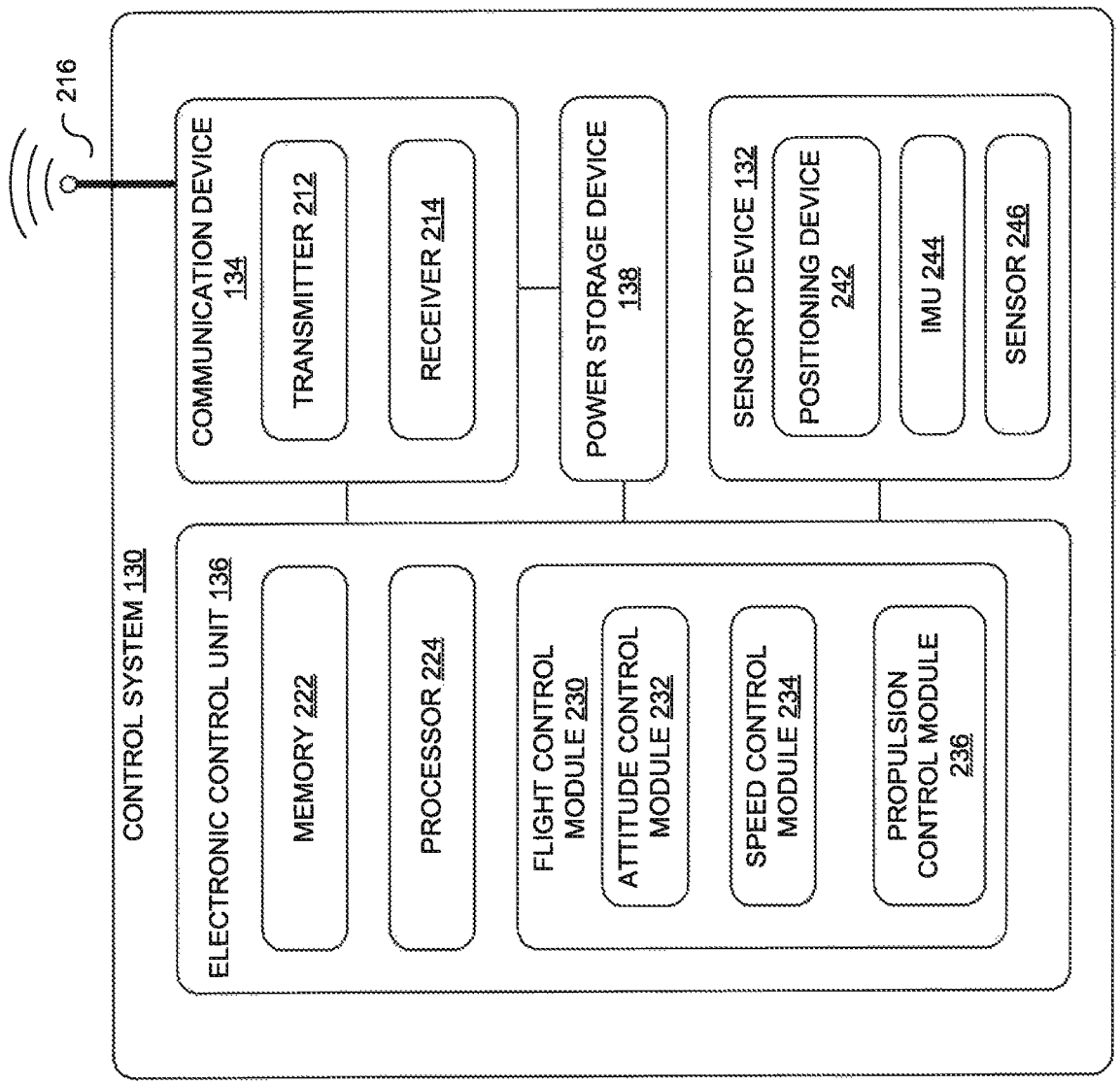
FIG. 2 is a schematic block diagram of a control system of a movable object consistent with the exemplary embodiments of this disclosure.

FIG. 2 is a schematic block diagram of control system 130 and second object 180, consistent with the exemplary embodiments of this disclosure. In addition to sensory device 132, communication device 134, and electronic control unit 136, control system 130 may also include power storage device 138, among other things. In addition to communication device 184, second object 180 may also include, inter alia, an electronic control unit 250.

Power storage device 138 may be a device configured to energize or otherwise supply power to electronic components, mechanical components, or combinations thereof in the movable object 100. For example, power storage device 138 may be a battery, a battery bank, or other device. In other embodiments, power storage device 138 may be or include one or more of a combustible fuel, a fuel cell, or another type of power storage device.

Communication device 134 may be an electronic device configured to enable wireless communication with other devices. For example, communication device 134 may include a transmitter 212, a receiver 214, circuitry, and/or other components. Transmitter 212 and receiver 214 may be electronic components respectively configured to transmit and receive wireless communication signals. In some embodiments, transmitter 212 and receiver 214 may be separate devices or structures. In other embodiments, transmitter 212 and receiver 214 may be combined (or their respective functions may be combined) in a single transceiver device configured to send (i.e., transmit) and receive wireless communication signals. Wireless communication signals may include any type of electromagnetic signal encoded with or otherwise indicative of data or information. Transmitter 212 and receiver 214 may be connected to one or more shared antennas, such as the exemplary antenna 216 illustrated in FIG. 2, or may transmit and receive using separate antennas or antenna arrays in movable object 100.

Communication device 134 may be configured to transmit and/or receive data from one or more other devices via suitable means of communication usable to transfer data and information to or from electronic control unit 136. For example, communication device 134 may be configured to utilize one or more local area networks (LAN), wide area networks (WAN), infrared systems, radio systems, Wi-Fi networks, point-to-point (P2P) networks, cellular networks, satellite networks, and the like. Optionally, relay stations, such as towers, satellites, or mobile stations, can be used, as well as any other intermediate nodes that facilitate communications between movable object 100 and second object 180. Wireless communications can be proximity dependent or proximity independent. In some embodiments, line-of-sight may or may not be required for communications.

Electronic control unit 136 may include one or more components, including, for example, a memory 222, at least one processor 224 (e.g., one or more processors 224), and a flight control module 230.

Memory 222 may be or include non-transitory computer readable media and can include one or more memory units of non-transitory computer-readable media. Non-transitory computer-readable media of memory 222 may be or include any type of disk including floppy disks, hard disks, optical discs, DVDs, CD-ROMs, microdrive, magneto-optical disks, ROMs, RAMs, EPROMs, EEPROMs, DRAMs, VRAMs, flash memory devices, magnetic or optical cards, nanosystems (including molecular memory integrated circuits), or any type of media or device suitable for storing instructions and/or data. Memory units may include permanent and/or removable portions of non-transitory computer-readable media (e.g., removable media or external storage, such as an SD card, RAM, etc.).

Information and data from sensory device 132 and/or other devices may be communicated to and stored in non-transitory computer-readable media of memory 222. Non-transitory computer-readable media associated with memory 222 may also be configured to store logic, code and/or program instructions executable by processor 224 to perform any of the illustrative embodiments described herein. For example, non-transitory computer-readable media associated with memory 222 may be configured to store computer-readable instructions that, when executed by processor 224, cause the processor to perform a method comprising one or more steps. The method performed by processor 224 based on the instructions stored in non-transitory computer readable media of memory 222 may involve processing inputs, such as inputs of data or information stored in the non-transitory computer-readable media of memory 222, inputs received from second object 180, inputs received from sensory device 132, and/or other inputs received via communication device 134. The non-transitory computer-readable media of memory 222 may be configured to store data obtained or derived from sensory device 132 to be processed by processor 224 and/or by second object 180 (e.g., via electronic control unit 136). In some embodiments, the non-transitory computer-readable media can be used to store the processing results produced by processor 224.

Processor 224 may include one or more processors and may embody a programmable processor (e.g., a central processing unit (CPU)). Processor 224 may be operatively coupled to memory 222 or another memory device configured to store programs or instructions executable by processor 224 for performing one or more method steps. It is noted that method steps described herein may be embodied by one or more instructions and data stored in memory 222 and that cause the method steps to be carried out when processed by the processor 224.

In some embodiments, processor 224 may be operatively coupled to one or more control modules, such as flight control module 230. Flight control module 230 may be configured to control the flight of movable object 100 according various information and data from sensory device 132 and/or other devices. In the illustrative embodiment of FIG. 2, flight control module 230 may include an attitude control module 232, a speed control module 234, and a propulsion control module 236. Attitude control module 232 may be configured to control an attitude (e.g., heading) of movable object 100. Speed control module 234 may be configured to control a flight speed of movable object 100. Propulsion control module 236 may be configured to control propulsion assemblies 120 of movable object 100 to implement the control of the position, orientation, flight direction, flight speed, and/or acceleration of movable object 100 during flight.

Attitude control module 232, speed control module 234, and propulsion control module 236 may be implemented in software comprising code or instructions, which when executed by processor 224, causes processor 224 to perform various methods or processes. Additionally or alternatively, each module may include its own processor (e.g., a processor that is similar to processor 224) and software code. For example, attitude control module 232, speed control module 234, and propulsion control module 236 may include one or more CPUs, ASICs, DSPs, FPGAs, logic circuitry, etc. configured to implement their respective functions, or may share processing resources in processor 224. As used herein, the term "configured to" should be understood to include hardware configurations, software configurations (e.g., programming), and combinations thereof, including when used in conjunction with or to describe any controller, electronic control unit, or module described herein. For convenience of discussion, a module may be described as being configured to perform a method, although it is understood that in some embodiments, it is processor 224 that executes code or instructions stored in that module to perform the method.

The components of electronic control unit 136 can be arranged in any suitable configuration. For example, one or more of the components of electronic control unit 136 can be located on housing 110 of movable object 100, carrier 150, payload 140, second object 180, sensory device 132, or an additional external device in communication with one or more of the above. In some embodiments, one or more processors or memory devices can be situated at different locations, such as on housing 110 of movable object 100, carrier 150, payload 140, second object 180, sensory device 132, or on an additional external device in communication with one or more of the above, or suitable combinations thereof, such that any suitable aspect of the processing and/or memory functions performed by the system can occur at one or more of the aforementioned locations.

Second object 180 may include the same or similar components as control system 130 in structure and/or function. Communication device 184 of second object 180, for example, may include a transmitter 262, a receiver 264, and an antenna 266. Transmitter 262 and receiver 264 may be the same or similar to transmitter 212 and receiver 214 of communication device 134 of control system 130, respectively, in structure and/or function, and therefore will not be described in detail. Electronic control unit 250 of second object 180 may be the same or similar to electronic control unit 136 in structure (e.g., may include memory, a processor, modules, etc.) and/or function, and therefore will not be described in detail.

Control system 130 may receive sensing data relating to flight status of movable object 100. The sensing data may include data indicative of at least one of a movement and a position of movable object 100, for example, while movable object 100 is in flight or at rest. For example, the sensing data may include one or more of a translational speed, a rotational speed, an acceleration, an orientation, or a height (e.g., height above ground, altitude, etc.) of movable object 100, but is not limited thereto and may include other or additional information. Sensing data may be detected or collected via sensory device 132. Sensory device 132 may include, for example, a positioning device 242, an inertial measurement unit (IMU) 244, and/or one or more other sensors 246 included in, connected to, or otherwise associated with control system 130. For simplicity, only one exemplary sensor 246 is shown in FIG. 2.

Positioning device 242 may be a device that is operable with a positioning system to obtain positioning information of movable object 100. Positioning device 242 may be a Global Positioning System (GPS) device or a device operable with another positioning system (e.g., Global Navigation Satellite System (GLONASS), Galileo, Beidou, GPS Aided GEO Augmented Navigation (GAGAN) system, Global Navigation Satellite System (GNSS), etc).

IMU 244 may include various types of inertia sensors, such as one or more integrated motion sensors and/or one or more integrated orientation sensors. For example, a motion sensor may include a velocity measurement instrument, and/or an acceleration measurement instrument (e.g. an accelerometer). An orientation sensor can include a gyroscope and a gravity gradient sensor (e.g. a gradiometer).

The one or more other sensors 246 may include, for example, magnetic sensors (e.g., compass, etc.), pressure sensors (e.g., absolute pressure sensors, differential pressure sensors, etc.), and one or more (e.g., a plurality of) distance sensors, which may include one or more cameras, infrared devices, ultraviolet devices, x-ray devices, ultrasonic devices, radar devices, laser devices. The one or more other sensors 246 may include other or additional sensors, such as temperature sensors (e.g., thermometers, thermocouples, etc.), proximity sensors, image sensors, etc.

With reference to FIG. 2, attitude control module 232 and speed control module 234 may be configured to analyze data to determine direction and speed information (e.g., may respectively include a direction analysis module and a speed analysis module) or otherwise may be configured to determine a direction and a speed of movable object 100 based on input received from sensory device 132.

For example, attitude control module 232 and speed control module 234 may be configured to receive positioning information of movable object 100 from positioning device 242, and positioning information of a target, and use the received positioning information, alone or in conjunction with information obtained from IMU 244 and sensor 246, to determine a desired flight direction from movable object 100 towards the target and a desired flight speed of movable object 100. In some embodiments, positioning information from positioning device 242 may include locational coordinates of movable object 100 and/or the target. In other embodiments, the location of movable object 100 or the target may be known and stored within memory associated with either of electronic control unit 136.

Movable object 100 may be configured with an automated flight function which allows movable 100 to move (e.g., fly) to a user-defined target without user's control. The target may have a fixed location and its positioning information (e.g., location coordinates) may be input by the user via an input device onboard movable object 100 before takeoff, or from a user-operated remote controller. The position information of the fixed target location may be pre-stored in memory 222 of electronic control unit 136. Alternatively, the target may be movable (e.g., may be another movable object such as second object 180) and may be equipped with a positioning device and a communication device onboard. Movable object 100 may be configured to acquire the positioning information of the movable target provided by the positioning device via the communication device onboard the movable target.

Traditionally, control system 130 of movable object 100 may be configured to control movable object 100 to move to the target based on the position (e.g., location coordinates) of the target, and the current position and heading of movable object 100. The heading of movable object 100 can be defined as the direction to which a nose or head of movable object 100 is pointed. The heading may be represented by a heading angle between a reference direction (e.g., north) and the direction to which the head of movable object 100 is pointed and projected perpendicularly onto the same plane as the reference direction. Control system 130 may obtain the position of movable object 100 from positioning device 242, and may obtain the heading of movable object 100 from a magnetic sensor (e.g., compass or magnetometer).

Control system 130 may use the following method to control the movement of movable object 100 during the automated flight. First, control system 130 may obtain a position $p_h$ of the target from, for example, user input or a positioning device onboard of the target. Control system 130 may also obtain a current position $p_c$ of movable object 100 from positioning device 242 of movable object 100. Both of the positioning information of the target and the positioning information of movable object 100 are expressed in a global coordinate system.

As used herein, the global coordinate system is a space-fixed coordinate system which is fixed, for example, with respect to the earth, regardless of the movement of movable object 100 or the target. For example, a three-dimensional global coordinate system may be defined with x-axis pointing north, y-axis pointing west, and z-axis pointing up. In contrast, a local coordinate system, which will be mentioned in the description below, is a body-fixed coordinate system which is fixed with respect to the body of movable object 100. For example, a three-dimensional local coordinate system may be defined with x-axis pointing in the heading direction of movable object 100, y-axis pointing to a side of movable object 100 when movable object 100 is facing the heading direction (i.e., y-axis being x-axis rotated laterally in 90°), and z-axis being perpendicular to both the x- and y-axes. When movable object 100 moves, either translationally or rotationally, the local coordinate system changes with respect to the global coordinate system. The heading direction of movable object 100 in the global coordinate system (referred to simply as "heading direction" below) determines the correspondence between the global coordinate system and the local coordinate system. Conversely, once the correspondence is known, the heading of movable object 100 can be determined.

In some exemplary embodiments, control system 130 controls movable object 100 to move in the two-dimensional, horizontal space towards the target. Discussions below therefore only concern the two-dimensional space. However, it should be noted that the principle of the present disclosure can also be applied to movements in the three-dimensional space. That is, the methods of the embodiments of the present disclosure can be used to control the attitude and speed of movable object 100 when movable object 100 moves in a three-dimensional space. In such situations, the two-dimensional, horizontal aspect of the 3-dimensional movement is analyzed for control of moveable object 100 consistent with the embodiments described herein.

Current position $p_c$ of movable object 100 and position $p_h$ of the target may both be two-dimensional values. Control system may calculate a two-dimensional (2D), horizontal, direction vector $d_g$ using Equation (1):

$$d_g = \frac{p_h - p_c}{\|p_h - p_c\|_2} \quad (1)$$

In Equation (1), $\|p_h - p_c\|_2$ is the scalar distance between current position $p_c$ of movable object 100 and position $p_h$ of the target. The difference between $p_h$ and $p_c$ provides a vector distance between the two. Thus, Equation (1) determines the direction vector $d_g$ from movable object 100 to the target in the global coordinate system.

Control system 130 may further acquire the current heading angle $\theta$ of movable object 100 from a magnetic sensor onboard of movable object 100. Control system 130 may then calculate a 2D direction vector $d_l$ from the current position of movable object 100 to the target in the local coordinate system by using Equation (2):

$$d_l = C_z(\theta) d_g \quad (2)$$

In Equation (2), $C_z(\theta)$ is a cosine conversion matrix for converting the global coordinate system to the local coordinate system.

Once $d_l$ is determined, control system 130 may input $d_l$ into flight control module 230 of movable object 100 as a desired flight direction of movable object 100 in the local coordinate system, such that flight control module 230 can control movable object 100 to fly in the target flight direction towards the target. When the distance $\|p_h - p_c\|^2$ between the current position of movable object 100 and the target is within an acceptable range, that is, less than a predetermined threshold value, control system 130 may control movable object 100 to land. In this manner, movable object 100 can automatically fly to the target without any external control.

According to the above description, automated flight depends on the position and heading of the movable object. Traditionally, control system 130 relies on positioning device 242 for obtaining the position information, and relies on a magnetic sensor (e.g., compass) for obtaining the heading information.

However, when a strong magnetic field exists in the proximity of movable object 100 or when movable object 100 is not equipped with a working magnetic sensor, control system 130 may not be able to obtain accurate heading information of movable object 100. In this scenario, control system 130 of movable object 100 cannot determine the global coordinate system with respect to its local coordinate system, and therefore cannot determine its heading direction in the global coordinate system. Consequently, control system 130 cannot control movable object 100 to fly along the correct flight direction towards the target, and movable object 100 may deviate from the correct flight route or even fly away from the target.

Figure 3:
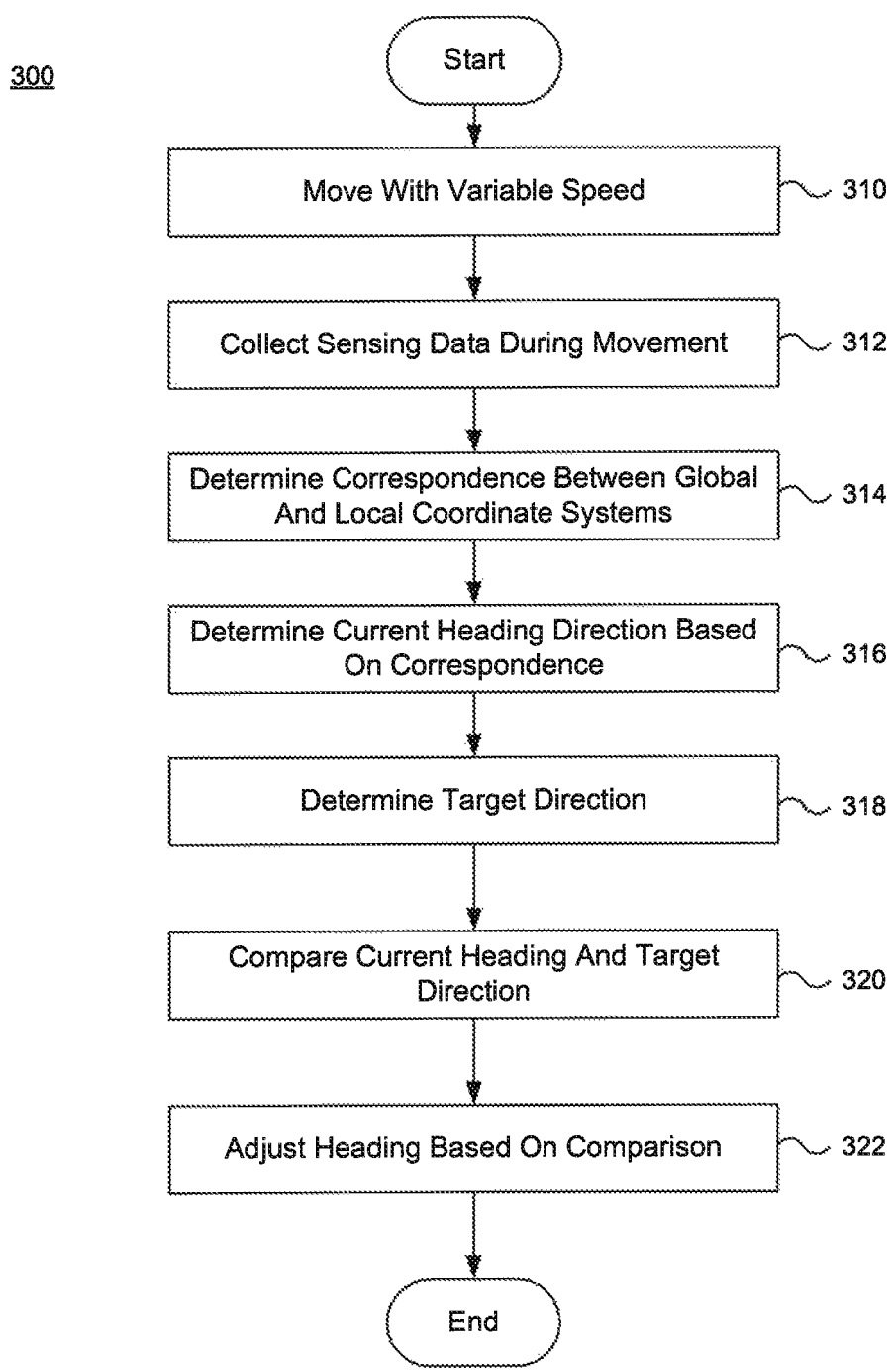
FIG. 3 is a flowchart of an exemplary control method for controlling a movable object 100 to move towards a target, according to an exemplary embodiment.

Consistent with embodiments of the present disclosure, control system 130 may determine the heading direction of movable object 100 without relying on a magnetic sensor, and may adjust the heading direction towards a target. FIG. 3 is a flowchart of an exemplary control method 300 for determining and adjusting a heading direction of movable object 100, according to an exemplary embodiment. Method 300 may be performed when a magnetic sensor (e.g., compass) on movable object 100 is malfunctioning or when movable object 100 does not include a magnetic sensor. Method 300 may be performed by various processors, modules, devices, and sensors provided on or external to movable object 100. In one embodiment, method 300 may be performed by control system 130 (e.g., processor 224) included in movable object 100.

As illustrated in FIG. 3, method 300 may include controlling movable object 100 to move along one or more directions around its current location (step 310), during which movable object 100 may be controlled to maintain a constant heading. That is, movable object 100 may be controlled to perform only translational movements, without rotations. The one or more directions may be substantially horizontal. At step 310, movable object 100 may move with variable speed, increasing or decreasing its speed within a relatively short time. In addition, movable object 100 may be controlled to move within a relatively small safety zone around its current location where there is no obstacle in the flight path.

Figure 4A:
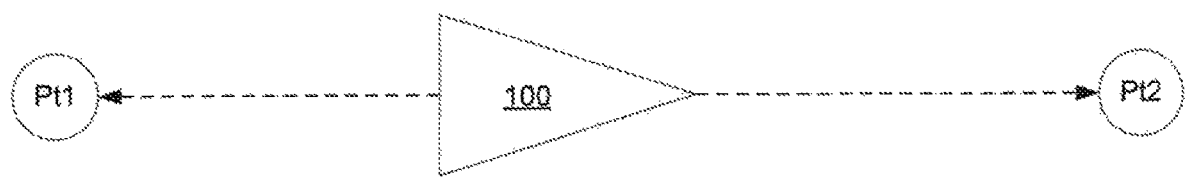
FIGS. 4A, 4B, and 4C schematically illustrate exemplary movements of a movable object with variable speed along one or more directions, according to exemplary embodiments.
Figure 4B:
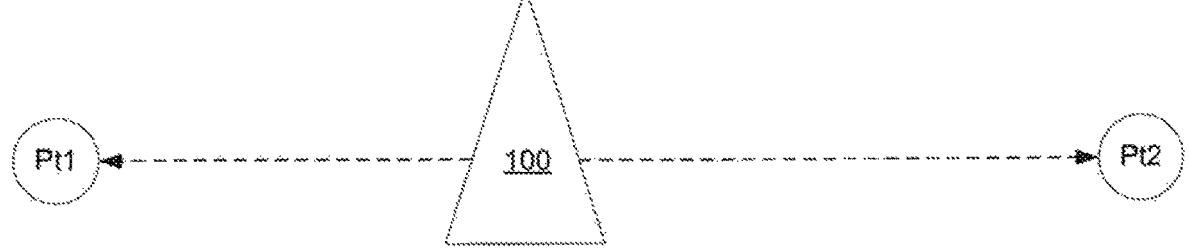
Figure 4C:
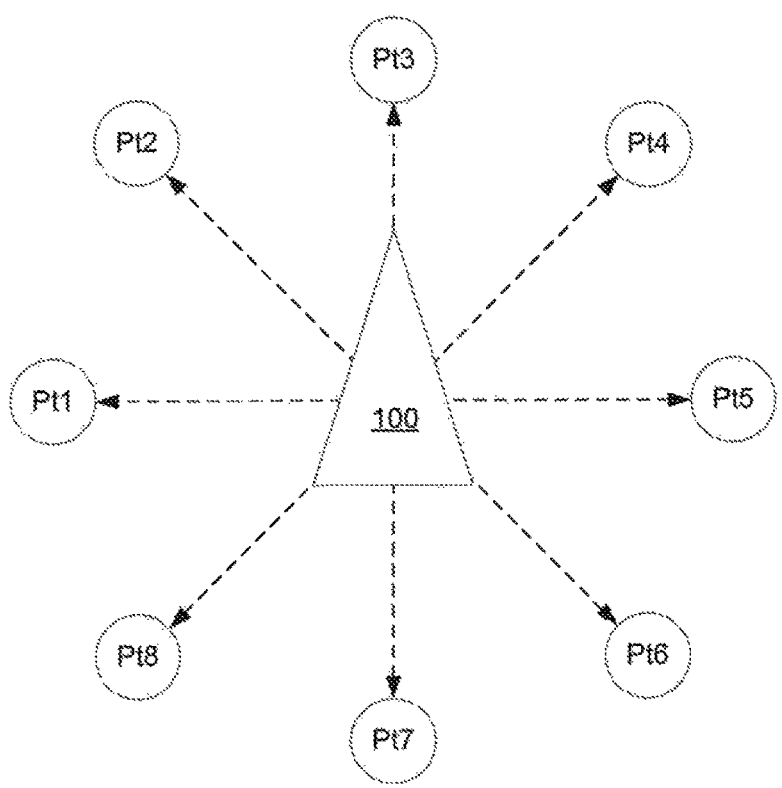

FIGS. 4A, 4B, and 4C schematically illustrate exemplary movements of movable object 100 along one or more directions, according to exemplary embodiments. As illustrated in FIG. 4A, movable object 100 may fly forward and backward between a first point Pt1 and a second point Pt2 using variable speed, while maintaining its heading oriented toward the second point Pt2. The first and second points Pt1 and Pt2 do not vertically overlap with each other. As illustrated in FIG. 4B, movable object 100 may fly left and right between the first point Pt1 and the second point Pt2 using variable speed, while maintaining its heading oriented toward a direction perpendicular to a line connecting the first point Pt1 and the second point Pt2. As illustrated in FIG. 4C, movable object 100 in radial directions between a center point and first through eighth points Pt1 through Pt8, while maintaining its heading oriented along a direction from the center point towards the third point Pt3.

Figure 5A:
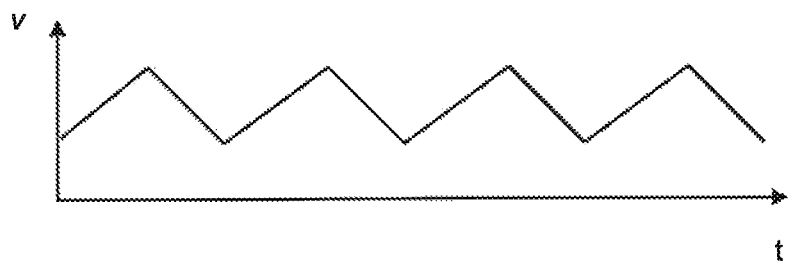
FIGS. 5A and 5B schematically illustrate exemplary speed of a movable object during a variable speed movement, according to exemplary embodiments.
Figure 5B:
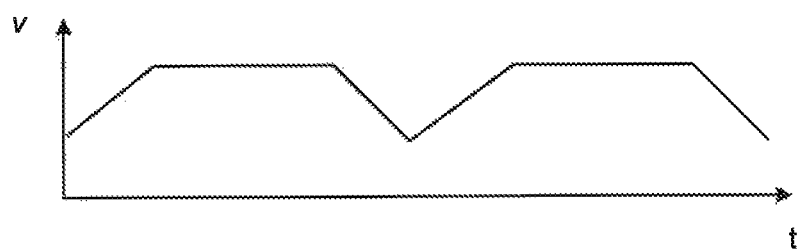

FIGS. 5A and 5B schematically illustrate exemplary speed of movable object 100 during a variable speed movement, according to exemplary embodiments. As illustrated in FIG. 5A, the speed v of movable object 100 may be periodically increased and decreased during the entire movement. As illustrated in FIG. 5B, the speed v of movable object 100 may be increased to a constant value, maintained for a period of time, and then decreased.

Referring back to FIG. 3, method 300 may collect sensing data from one or more sensors onboard movable object 100 during the movement with the variable speed (step 312). For example, control system 130 may be configured to collect positioning data, velocity data, and/or acceleration data of movable object 100 during the movement of movable object 100. Control system 130 may be configured to collect a unit flight direction r of movable object 100 in the local coordinate system. The unit flight direction r of movable object 100 may be an expected unit flight direction determined based on calculated control signals for the rotary components 125. Alternatively, the unit flight direction r may be determined based on feedback from the accelerometer. Control system 130 may also collect, from positioning device 242, a horizontal position $p_o$ of movable object 100 in the global coordinate system at an initial time $t_o$, a horizontal position $p_c$ of movable object 100 in the global coordinate system at the current time $t_c$, and/or an average velocity $\bar{v}_{oc}$ of movable object 100 in the global coordinate system over the period from time $t_o$ to time $t_c$.

Method 300 may include determining a correspondence between the global coordinate system and the local coordinate system based on the sensing data collected during the movement (step 314). For example, control system 130 may first determine a unit flight direction s of movable object 100 in the global coordinate system by using either Equation (3) or Equation (4):

$$s = \frac{p_c - p_o}{\|p_c - p_o\|_2} \quad (3)$$

$$s = \frac{\bar{v}_{oc}}{\|\bar{v}_{oc}\|_2} \quad (4)$$

As another example, control system 130 may determine a current velocity $v_c$ and a historical velocity $v_{ex}$, which is the velocity of movable object 100 at a historical time point, based on the acceleration data of movable object 100 measured by the accelerometer during the movement with the variable speed. Control system 130 may calculate the unit flight direction s of movable object 100 in the global coordinate system by using Equation (5):

$$S = \frac{v_c - v_{ex}}{\|v_c - v_{ex}\|_2}$$

Control system 130 may then determine the correspondence between the global coordinate system and the local coordinate system based on the unit flight direction s of movable object 100 in the global coordinate system, and the unit flight direction r of movable object 100 in the local coordinate system. The correspondence may be represented by a matrix $c_z$:

$$C_z = \begin{bmatrix} r_x s_x + r_y s_y & r_x s_y - r_y s_x \\ r_y s_x - r_x s_y & r_x s_x + r_y s_y \end{bmatrix}$$

Once the correspondence between the global coordinate system and the local coordinate system is determined, method 300 may determine the current heading direction of movable object 100 (step 316). For example, control system 130 may determine a current heading angle θ of movable object 100 based on the matrix $C_z$. In one aspect of the exemplary embodiments, the method of determining the correspondence between the two coordinate systems may also be performed to detect possible malfunctions of a magnetic sensor (e.g., compass).

Method 300 may determine a target direction from the current position of movable object 100 to the target (step 318). For example, control system 130 may determine a target direction $d_g$ in the global coordinate system by using Equation (1). Method 300 may then compare the current heading direction (which is in the global coordinate system) with the target direction $d_g$ of movable object 100 (step 320). For example, control system 130 may calculate an angle between the current heading direction with the target direction $d_g$ of movable object 100.

Alternatively, steps 318 and 320 may be performed in the local coordinate system. That is, in step 318, control system 130 may convert the target direction $d_g$ in the global coordinate system into a target direction $d_l$ in the local coordinate system based on the correspondence between the two coordinate systems, by using Equation (6):

$$d_l = c_z d_g = \begin{bmatrix} r_x s_x + r_y s_y & r_x s_y - r_y s_x \\ r_y s_x - r_x s_y & r_x s_x + r_y s_y \end{bmatrix} d_g \quad (6)$$

Then, in step 320, control system 130 may then compare the target direction $d_l$ with the x-axis of the local coordinate system (which is the heading direction of movable object 100 in the local coordinate system). For example, control system 130 may determine an angle between the target direction $d_l$ in the local coordinate system with the x-axis of the local coordinate system, and the difference is used to adjust the heading direction of movable object 100.

In some embodiments, during the variable speed movement of movable object 100, control system 130 may be configured to collect sensing data at different times to obtain multiple sets of sensing data, and determine the current heading and/or the target direction based on the multiple sets of sensing data to obtain multiple determination results. Control system 130 may then determine an average current heading and/or an average target direction based on the multiple determination results. In this manner, the accuracy of the determination may be improved.

Based on the comparison between the heading direction and target direction of movable object 100, either both in the global coordinate system or both in the local coordinate system, method 300 may adjust the heading of movable object 100 based on the comparison (step 322). For example, control system 130 may adjust the heading of movable object 100 to be substantially directed towards the target. Control system 130 may determine an angular velocity of movable object 100 to reduce or eliminate the difference, and may control movable object 100 to move (i.e., rotate) according to the angular velocity. In some embodiments, during the movement of movable object 100 according to the angular velocity, control system 130 may constantly monitor and adjust the current heading of movable object 100 until a pre-defined criterion is satisfied. The pre-defined criteria may be, for example, the difference between the current heading and the target direction being zero or less than a predefined threshold angle. After step 322, method 300 may end. Therefore, by using method 300 described above, control system 130 may adjust the heading of movable object 100 based on sensing data collected from sensors excluding a magnetic sensor.

Once the heading of movable object 100 is adjusted to be directed towards the target, movable object 100 may be controlled to move along its heading direction, i.e., the adjusted heading, towards the target. As movable object 100 moves, the heading direction of movable object 100 may be constantly adjusted to be directed towards the target, in order to ensure that movable object 100 is moving along the correct direction.

Figure 6:
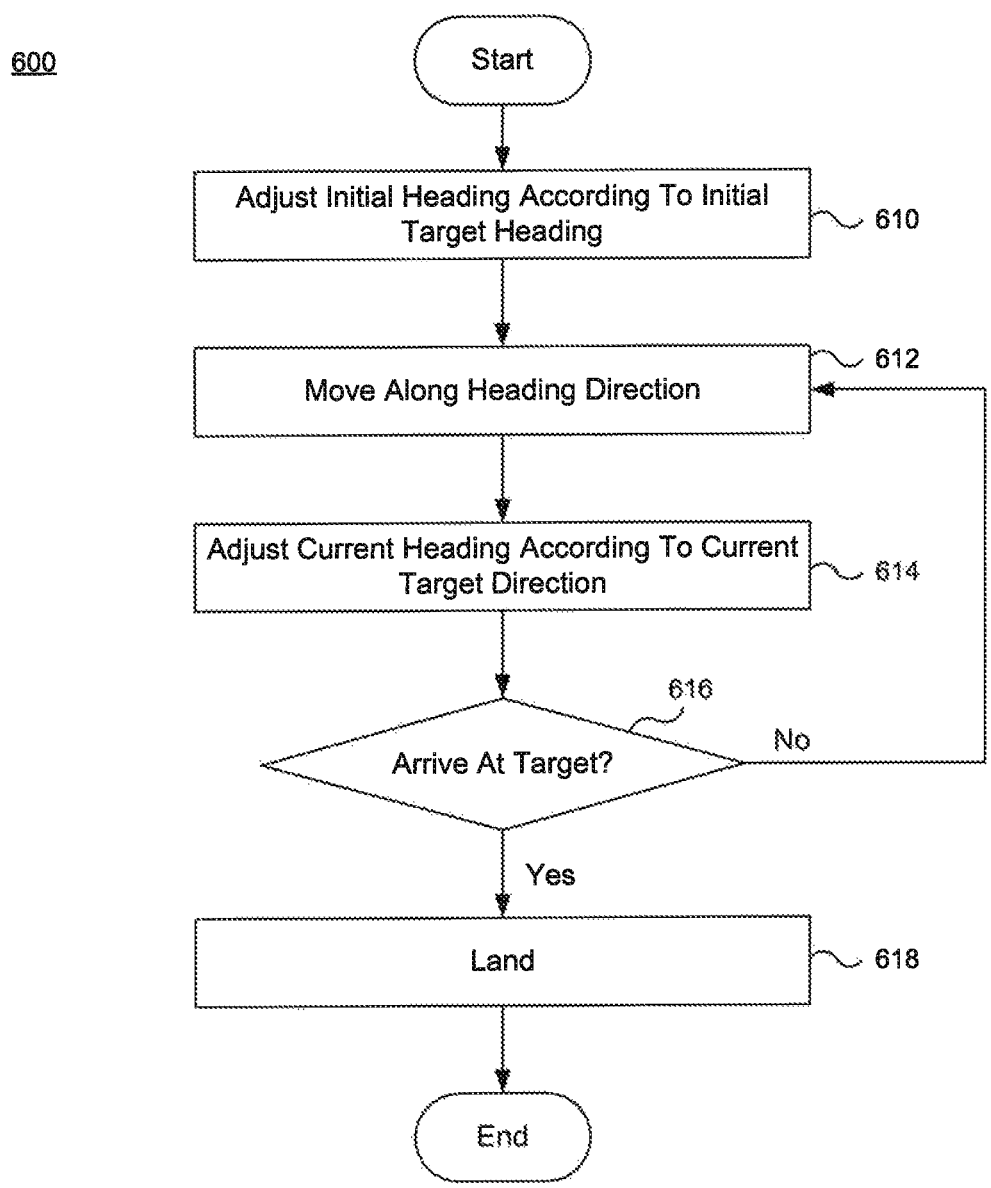
FIG. 6 is a flowchart of an exemplary control method for adjusting a heading of a movable object, according to an exemplary embodiment.
Figure 7:
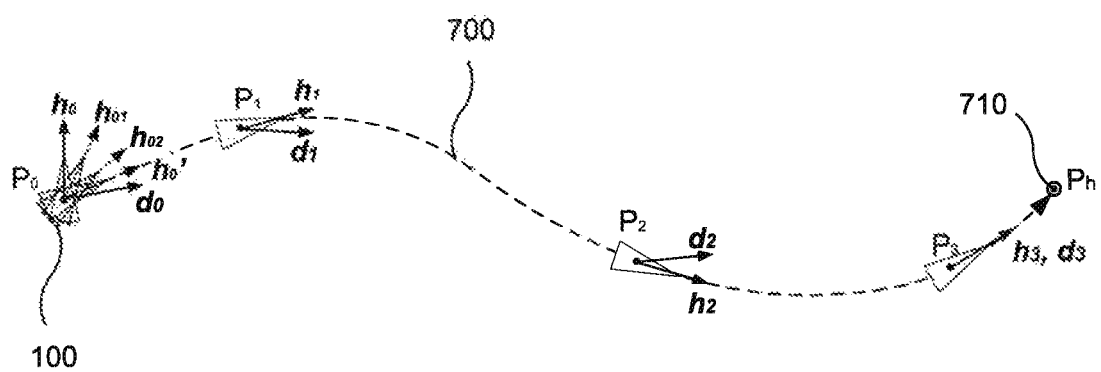
FIG. 7 schematically illustrates a travel path of a movable object from an initial point to a target, according to an exemplary embodiment.

FIG. 6 is a flowchart of an exemplary control method 600 for controlling movable object 100 to move towards a target, according to an exemplary embodiment. FIG. 7 schematically illustrates a travel path 700 of movable object 100 from an initial point $P_0$ to a target 710 at point $P_h$. Method 600 may be performed by various processors, modules, devices, and sensors provided on or external to movable object 100.

In one embodiment, method 600 may be performed by control system 130 (e.g., processor 224) included in movable object 100.

As illustrated in FIG. 6, method 600 may adjust an initial heading $h_0$ of movable object 100 according to an initial target direction $d_0$ (step 610). In some embodiments, control system 130 may adjust the initial heading of movable object 100 by using method 300 of FIG. 3. For example, as illustrated in FIG. 7, initially, movable object 100 is located at point $P_0$, the initial heading $h_0$ of movable object 100 is directed to the north, and the initial target direction $d_0$ is directed from movable object 100 towards target 710 at point $P_h$. Control system 130 may control movable object 100 to move (e.g., rotate) to at least reduce, or even eliminate, a difference between the initial heading $h_0$ and the initial target direction $d_0$. For example, the initial heading of movable object 100 may be adjusted such that an angle between the initial heading and the target direction is less than a predetermined threshold angle. In the example illustrated in FIG. 7, after the adjustment, the heading of movable object 100 is $h_0'$.

In some embodiments, control system 130 may adjust the initial heading of movable object 100 in a feedback control loop, in which a difference between the current heading and the target direction is determined in real time or periodically, and the heading is adjusted based on the difference. For example, control system 130 may adjust one or more intermediate headings of movable object 100, before the initial heading of control system 130 satisfies the pre-defined criteria. In the example illustrated in FIG. 7, at point P0, control system 130 may determine and adjust intermediate headings $h_{01}$ and $h_{02}$ before the heading of movable object 100 finally becomes $h_0'$.

After step 610 of adjusting the initial heading $h_0$ to become $h_0'$, method 600 may control movable object 100 to move along its heading direction $h_0'$ (step 612). For example, control system 130 may control movable object 100 to move along its heading direction in a predetermined distance or for a predetermined time period. As illustrated in FIG. 7, movable object 100 may move along its heading direction $h_0'$ from point $P_0$ to point $P_1$. In some embodiments, when movable object 100 moves along its heading direction, the movement of movable object 100 may be similar to the movement of a car. That is, movable object 100 may only move forward or rotate about a vertical axis (e.g., a yaw axis of movable object 100, or a vertical axis external to movable object 100), but cannot perform lateral movement (i.e., move along a transverse axis of movable object 100). As a result, the heading of movable object 100 may also be the movement direction (e.g., flight direction) of movable object 100. In some alternative embodiments, movable object 100 may be controlled to move laterally (e.g., along its transverse axis or along any lateral direction) in addition to moving forward and/or rotating. In this case, the movement direction of movable object 100 may not be the same as the heading of movable object 100. In still some alternative embodiments, movable object 100 may be controlled to move along a lateral direction with a constant heading. In this case, the relationship (e.g., angle) between the movement direction of movable object 100 and the heading of movable object is constant.

Traditionally, once the heading of movable object 100 is adjusted to be directed towards target 710, movable object 100 may be controlled to move along its heading direction towards target 710 in a constant speed along a straight line. However, moving along its heading direction in a straight line requires maintaining a constant heading, which is typically difficult because the heading direction may deviate from an intended direction due to various factors such as weather (e.g., wind), movements to avoid obstacles, etc. Therefore, the heading direction needs to be constantly adjusted, which requires real time information of the heading of movable object 100. In the absence of sensing data from the magnetic sensor or when the magnetic sensor is severely disturbed, control system 130 could not obtain accurate information of the current heading of movable object 100. Thus, control system 130 could not determine the current flight direction of movable object 100, during the flight of movable object 100. Consequently, it is typically difficult for control system 130 to maintain a constant heading towards target 710 without the magnetism sensing data.

In order to solve the above-described problem, in the embodiment illustrated in FIGS. 6 and 7, after movable object 100 moves along its heading direction in a predetermined distance or for a predetermined time period, method 600 may adjust the heading of movable object 100 according to a current target direction of movable object 100 (step 614). As illustrated in FIG. 7, when movable object 100 moves to point $P_1$, the current heading of movable object 100 is $h_1$, and the current target direction from the current position $P_1$ of movable object 100 towards target 710 at point $P_h$ is $d_1$. Control system 130 may adjust the current heading $h_1$ of movable object 100 based on the current target direction $d_1$, e.g., to reduce a difference between the current heading $h_1$ and the current target direction $d_1$, so as to ensure that movable object 100 moves towards target 710. In some embodiments, when adjusting the current heading $h_1$ of movable object 100, control system 130 may determine and adjust one or more intermediate headings of movable object 100.

In step 614, control system 130 may first estimate a current heading of movable object 100, estimate the current target direction of movable object 100, and control movable object 100 to reduce a difference between the current heading and the current target direction. Control system 130 may estimate the current heading based on a position change of movable object 100 when movable object 100 moves along the heading direction in step 612. The position change of movable object 100 represents a flight direction of movable object 100 when movable object 100 moves from position $P_0$ to position $P_1$. Since movable object 100 is controlled to move along its heading direction, the flight direction of movable object 100 is also the current heading of movable object 100. Alternatively, control system 130 may estimate the current heading by using steps 310-316 of method 300 of FIG. 3. Control system 130 may estimate the current target direction based on the current position of movable object 100 and the current position of target 710.

Method 600 may further include determining whether movable object 100 arrives at target 710 (step 616). In some embodiments, control system 130 may determine whether movable object 100 arrives at target 710 by determining whether a horizontal distance between the current position of movable object 100 and the position $P_h$ of target 710 is less than a pre-defined threshold distance value. When the horizontal distance is less than the pre-defined threshold distance value, control system 130 may determine that movable object 100 arrives at target 710. In some alternative embodiments, control system 130 may determine whether movable object 100 arrives at target 710 by determining whether movable object 100 is directly above target 710. For example, control system 130 may control sensory device 160 attached to movable object 100 to capture an image directly underneath movable object 100. Then, control system 130 may analyze the captured image to determine whether the image contains target 710. If the captured image contains target 710, control system 130 may determine that movable object 100 is directly above target 710.

If movable object 100 has not arrived at target 710 (step 616: No), method 600 may repeat step 612 of controlling movable object 100 to move along its current heading direction and step 614 of adjusting the heading of movable object 100. In the example illustrated in FIG. 7, movable object 100 may move along its current heading direction from point P1 to point P2, and the heading $h_2$ of movable object 100 at point P2 may be adjusted according to the target direction $d_2$. Then, movable object 100 may move from point P2 to point P3, and the heading $h_3$ of movable object 100 at point P3 may be adjusted according to the target direction $d_3$.

If movable object 100 arrives at target 710 (step 616: Yes), method 600 may include controlling movable object 100 to land at target 710 (step 618). After movable object 100 lands at target 710, method 600 may end.

In some embodiments, step 612 of method 600 may be skipped. That is, initially, movable object 100 may be controlled to move along its initial heading direction (step 612), regardless of whether the heading direction is direction towards the target. Then, as movable object 100 moves, its heading direction may be adjusted in real time or periodically to be directed towards the target. However, since the initial heading direction might be different from the target direction, skipping step 612 may result in a longer flight path.

Figure 8:
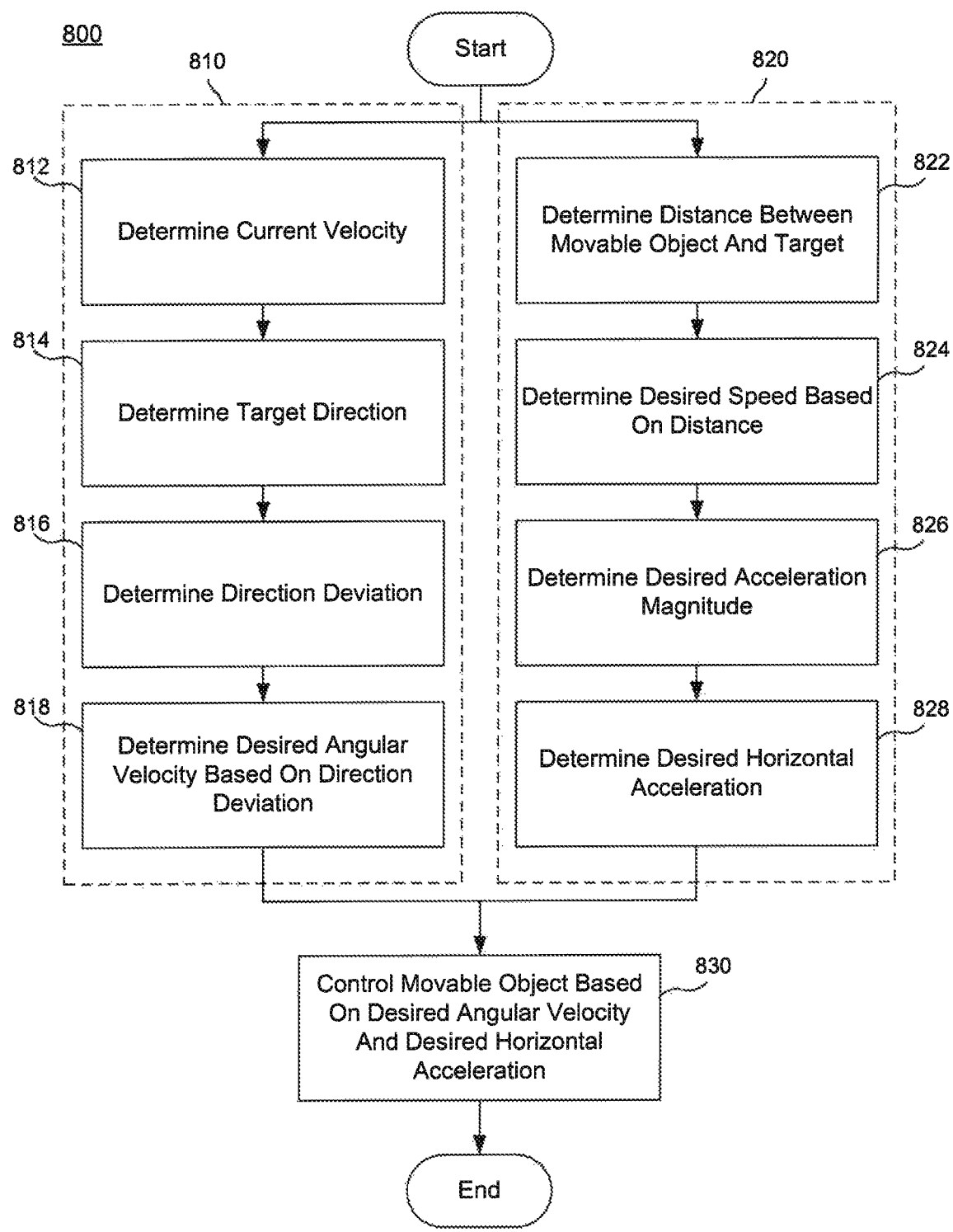
FIG. 8 is a flowchart of an exemplary control method for controlling a movable object during the movement towards a target, according to an exemplary embodiment.
Figure 9:
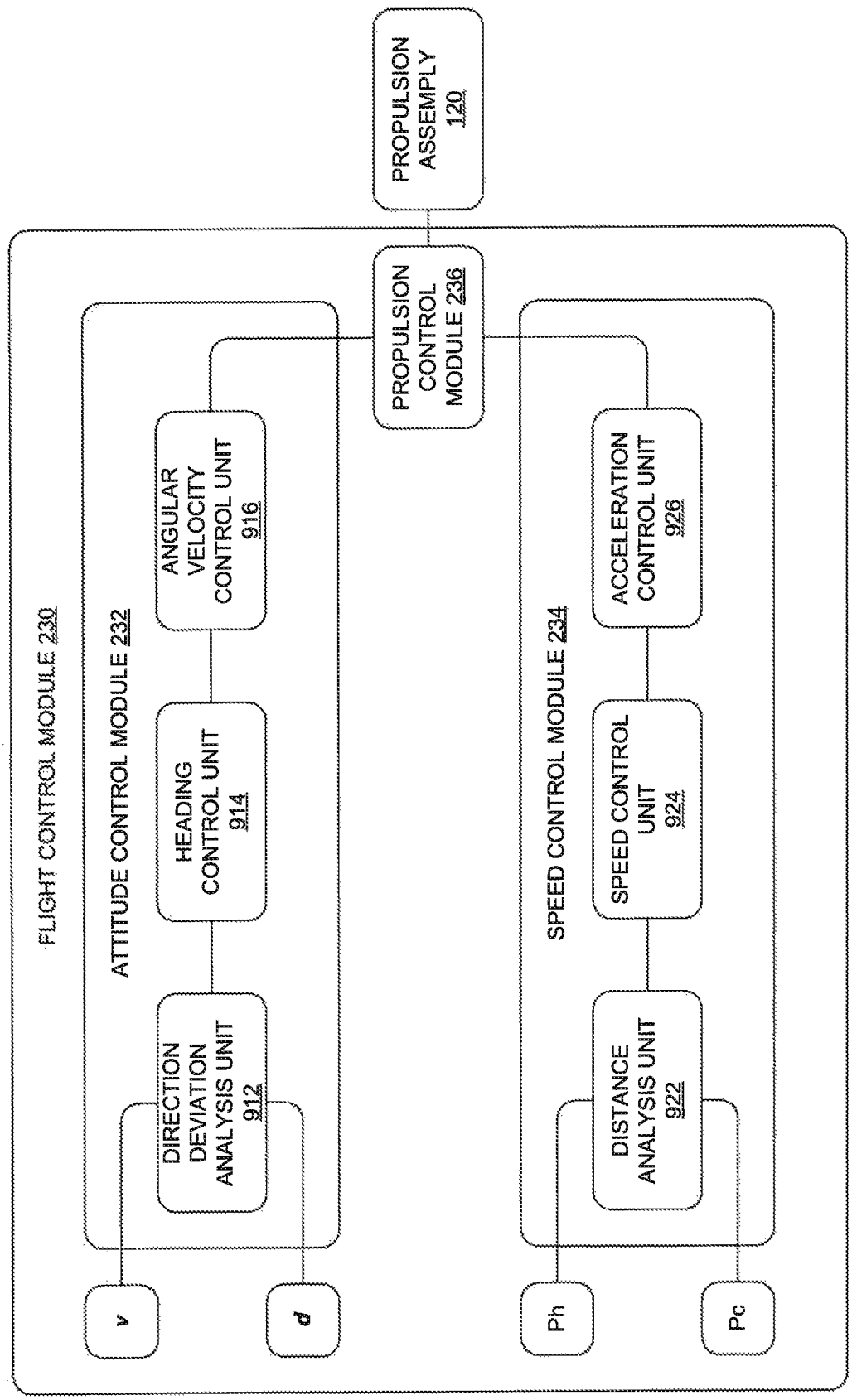
FIG. 9 schematically illustrates a flight control module for performing the method of FIG. 8, according to an exemplary embodiment.

FIG. 8 is a flowchart of an exemplary control method 800 for controlling movable object 100 during the movement towards target 710, according to an exemplary embodiment. Method 800 may be performed when a magnetic sensor (e.g., compass) on movable object 100 is malfunctioning. FIG. 9 schematically illustrates flight control module 230 for performing method 800, according to an exemplary embodiment.

As illustrated in FIG. 8, method 800 may include a process 810 for controlling a direction of movable object 100, and a process 820 for controlling a speed of movable object 100. Since movable object 100 is controlled to move along its heading direction, controlling the direction of movable object 100 also controls the heading of movable object 100. Process 810 and process 820 may be performed in series or in parallel. Since movable object 100 is controlled to move along its heading direction, the movement direction of movable object 100 is also the heading of movable object 100.

As illustrated in FIG. 9, flight control module 230 may include an attitude control module 232, a speed control module 234, and a propulsion control module 236. Attitude control module 232 may include a direction deviation analysis unit 912, a heading control unit 914, and an angular velocity control unit 916. Speed control module 234 may include a distance analysis unit 922, a speed control unit 924, and an acceleration control unit 926.

Process 810 for controlling the movement direction of movable object 100 may determine a current velocity of movable object 100 (step 812). For example, direction deviation analysis unit 912 may collect positioning information of movable object 100 during a time period immediately prior to a current time. Then, direction deviation analysis unit 912 may determine a current horizontal velocity v of movable object 100 in the global coordinate system, or an average horizontal velocity of movable object 100 in the global coordinate system, based on positioning information of movable object 100 during a time period immediately prior to the current time.

Process 810 may determine a target direction of movable object 100 (step 814). For example, direction deviation analysis unit 912 may determine a target direction $d_g$ from the current position of movable object 100 to target 710 in the global coordinate system by using Equation (1).

Process 810 may determine a direction deviation of movable object 100 relative to the target (step 816). The direction deviation may be represented by an angle $\theta_e$ between the current direction and the target direction of movable object 100. For example, direction deviation analysis unit 912 may calculate the deviation $\theta_e$ by using Equation (7):

$$\theta_e = \tan 2^{-1}(v_x d_{1y} - v_y d_{1x}, v_x d_{1x} + v_y d_{1y}) \tag{7}$$

In some alternative embodiments, instead of using steps 812-816 to determine the direction deviation, direction deviation analysis unit 912 may use steps 310-320 in FIG. 3 to determine the direction deviation. Since movable object 100 is controlled to move along its heading direction, the movement direction of movable object 100 is also the heading of movable object 100. Thus, the angle between the current heading and the target direction of movable object 100 may be equal to the direction deviation.

Process 810 may determine a desired angular velocity based on the direction deviation (step 818). For example, direction deviation analysis unit 912 may output the deviation $\theta_e$ to heading control unit 914. Heading control unit 914 may determine a desired angular velocity $\omega_c$ based on the deviation $\theta_e$, in order to reduce or eliminate the deviation $\theta_e$. For example, heading control unit 914 may determine the desired angular velocity $\omega_c$ using Equation (8):

$$\omega_c = \begin{cases} k_0 \theta_e & \text{if } k_0 \theta_e < \omega_{max} \\ \omega_{max} & \text{if } k_0 \theta_e \geq \omega_{max} \end{cases} \tag{8}$$

In Equation (8), $k_0$ is a positive coefficient, and $\omega_{max}$ is a maximum allowable angular velocity of movable object 100.

Heading control unit 914 may output the desired angular velocity $\omega_c$ to angular velocity control unit 916. Angular velocity control unit 916 may output a control signal including the desired angular velocity $\omega_c$ to propulsion control module 236.

Process 820 for controlling the speed of movable object 100 may determine a distance between movable object 100 and target 710 (step 822). For example, distance analysis unit 922 may acquire the current position $p_c$ of movable object 100 and the current position $p_h$ of target 710. Distance analysis unit 922 may determine the distance $P_e$ between the current position of movable object 100 and target 710 by using Equation (9):

$$p_e = \|p_h - p_c\|_2 \tag{9}$$

Process 820 may determine a desired speed of movable object 100 based on the distance. For example, distance analysis unit 922 may output the distance $P_e$ to speed control unit 924. Speed control unit 924 may determine a desired speed $v_c$ of movable object 100 based on the distance $P_e$ by using Equation (10):

$$v_c = \begin{cases} k_1 p_e & \text{if } k_1 p_e < v_{max} \\ v_{max} & \text{if } k_1 p_e \geq v_{max} \end{cases} \quad (10)$$

In Equation (9), $k_1$ is a positive coefficient, and $v_{max}$ is a maximum allowable speed of movable object 100.

Process 820 may include determine a desired acceleration magnitude (step 826). For example, distance analysis unit 922 may output the desired speed $v_c$ to acceleration control unit 926. Acceleration control unit 926 may determine a desired acceleration magnitude $a_c$ based on the desired speed $v_c$ and the current horizontal velocity v of movable object 100 using Equation (11):

$$a_c = k_2(v_c - \|v\|_2) \quad (11)$$

In Equation (11), $k_2$ is a positive coefficient.

Process 820 may then determine a desired horizontal acceleration (step 828). For example, acceleration control unit 926 may determine a desired horizontal acceleration $a_b$ based on the desired acceleration magnitude $a_c$ and the target direction $d_g$ in the local coordinate system by using Equation (12):

$$a_b = a_c \cdot d_3 \quad (12)$$

Acceleration control unit 926 may output the desired horizontal acceleration $a_b$ to propulsion control module 236. Acceleration control unit 926 may output a control signal including the desired horizontal acceleration $a_b$ to propulsion control module 236.

After performing process 810 and process 820, method 800 may further control the movement of movable object 100 according to the desired angular velocity $\omega_c$ and the desired horizontal acceleration $a_b$. For example, after receiving the control signals including the desired angular velocity $\omega_c$ and the desired horizontal acceleration $a_b$ from angular velocity control unit 916 and acceleration control unit 926, respectively, propulsion control module 236 may control one or more propulsion assemblies 120 to enable movable object 100 to move (i.e., rotate) in the desired angular velocity $\omega$ and the desired horizontal acceleration $a_b$. For example, propulsion control module 236 may control the rotational speed of rotary components 125 based on the desired angular velocity $\omega$ and the desired horizontal acceleration $a_b$.

Method 800 may be performed in an iterative process, at different waypoints, e.g., points, P1, P2, and P3, on travel path 700 from initial position P0 to target 710 at position Ph.

In the above-described embodiments, movable object 100 is controlled to move along its heading direction. The present disclosure is not limited thereto. That is, in some embodiments, movable object 100 may be controlled to move along any lateral axis. Movable object 100 can be controlled to adjust its movement direction based on a direction deviation.

Figure 10:
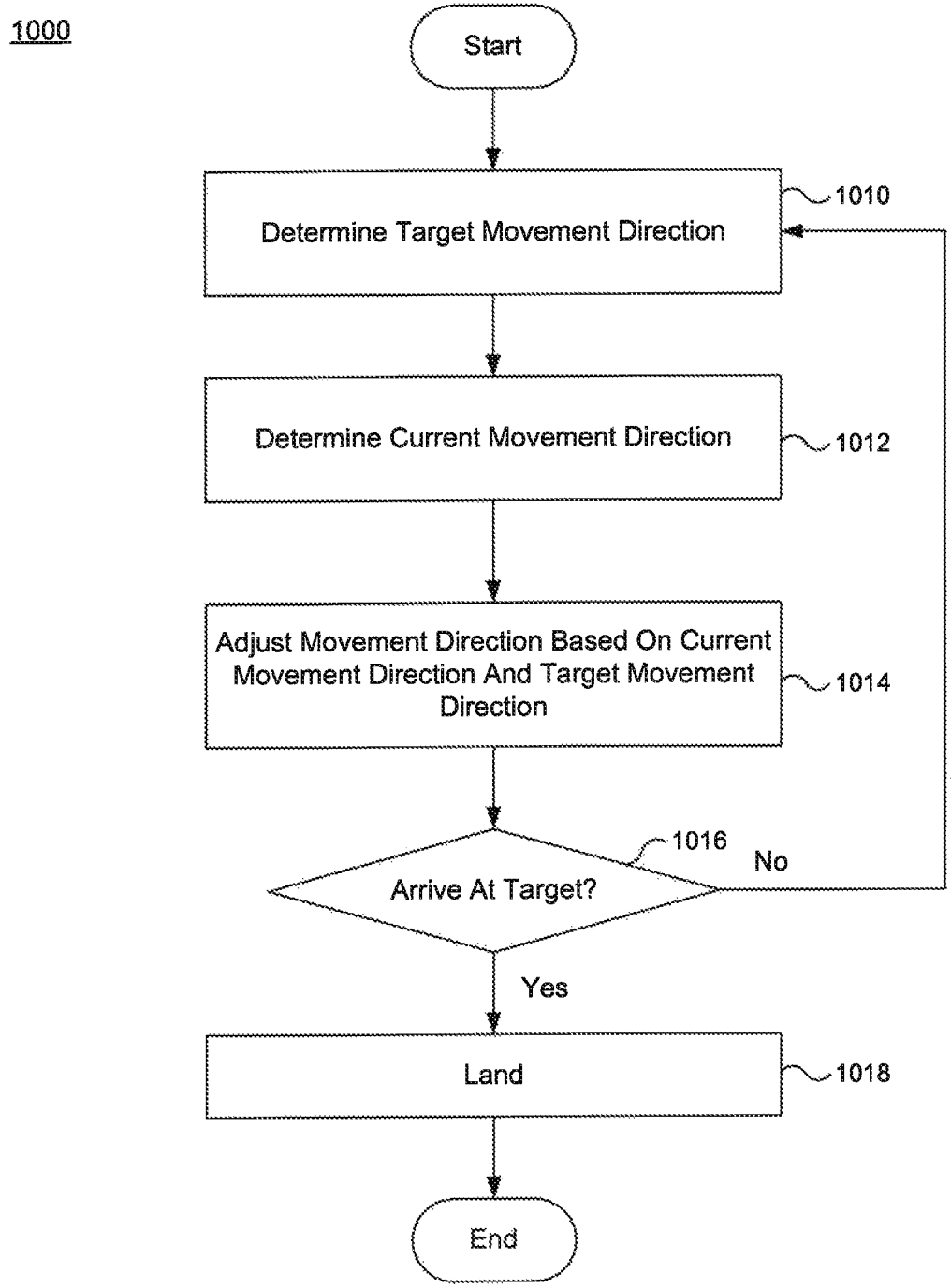
FIG. 10 is a flowchart of an exemplary control method for controlling a movable object to move towards a target, according to an exemplary embodiment.

FIG. 10 is a flowchart of an exemplary control method 1000 for controlling movable object 100 to move towards a target, according to the above-described embodiment. Method 1000 may be performed by various processors, modules, devices, and sensors provided on or external to movable object 100. In one embodiment, method 300 may be performed by control system 130 (e.g., processor 224) included in movable object 100.

Method 1000 may include determining a target movement direction of movable object 100 (step 1010). For example, control system 130 may determine the target movement direction based on the current position of movable object 100 and the position of target 710. The target movement direction may be $d_l$ in the local coordinate system, or $d_g$ in the global coordinate system.

Method 1000 may also include determining a current movement direction of movable object 100 (step 1012). For example, control system 130 may determine the current movement direction of movable object 100 based on a change of the position of movable object 100 over a time period prior to determining the current movement direction. The current movement direction may be direction r in the local coordinate system or direction s in the global coordinate system.

Method 1000 may include adjusting the movement direction of movable object 100 based on the target movement direction and the current movement direction (step 1014). For example, control system 130 may determine a difference (e.g., an angle) between the target movement direction and the current movement direction, either both in the global coordinate system or both in the local coordinate system. Control system 130 may then determine a desired angular velocity to reduce or eliminate the difference, and control the movement of movable object 100 according to the desired angular velocity.

Method 1000 may further include determining whether movable object 100 arrives at target 710 (step 1016). In some embodiments, control system 130 may determine whether a horizontal distance between the current position of movable object 100 and the position of target 710 is less than a pre-defined threshold distance value. When the horizontal distance is less than the pre-defined threshold distance value, control system 130 may determine that movable object 100 arrives at target 710. In some alternative embodiments, control system 130 may determine whether movable object 100 arrives at target 710 by determining whether movable object 100 is directly above target 710.

If movable object 100 has not arrived at target 710 (step 1016: No), method 1000 may repeat steps 1010-1016. If movable object 100 arrives at target 710 (step 1016: Yes), method 1000 may include controlling movable object 100 to land at target 710 (step 1018). After movable object 100 lands at target 710, method 1000 may end.

The control methods according to the embodiments described above can be applied to determine a current heading of a movable object when a magnetic sensor on the movable object is malfunctioning. Based on the current heading and a location of a target, movable object 100 can be controlled to move towards the target without deviating from a correct route.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling a movable object, the method comprising:
    collecting sensing data from one or more sensors onboard the movable object during movement of the movable object with a variable speed along one or more directions, wherein the one or more sensors do not include a magnetic sensor;
    determining a correspondence between a local coordinate system and a global coordinate system based on the sensing data;
    determining an initial heading of the movable object based on the correspondence; and reducing a difference between the initial heading and a target direction by controlling an angular velocity of the movable object.

2. The method of claim 1, wherein the movable object is an unmanned aerial vehicle (UAV), the method further including:
controlling the UAV to maintain a constant heading while controlling the UAV to move with the variable speed along the one or more directions, wherein the initial heading is the constant heading.

3. The method of claim 1, wherein controlling the angular velocity to reduce the difference between the initial heading and the target direction comprises:
estimating an intermediate heading of the movable object; and
controlling the angular velocity based at least in part on at least a difference between the intermediate heading and the target direction.

4. The method of claim 1, further comprising, after controlling the angular velocity to reduce the difference between the initial heading and the target direction:
controlling the movable object to move along the target direction direction.

5. The method of claim 1, wherein determining the correspondence comprises:
comparing a current movement direction of the movable object in the local coordinate system and a current movement direction of the movable object in the global coordinate system; and
determining the correspondence between the local coordinate system and the global coordinate system based on a result of the comparison.

6. An unmanned aerial vehicle (UAV), comprising:
one or more sensors configured to generate sensing data related to the UAV;
a memory storing instructions; and
a controller comprising a processor configured to execute the instructions to:
collect the sensing data from the one or more sensors during movement of the UAV with variable speed along one or more directions, without collecting data from a magnetic sensor;
determine a correspondence between a local coordinate system and a global coordinate system based on the sensing data;
determine an initial heading of the UAV based on the correspondence; and
reduce a difference between the initial heading and a target direction by controlling an angular velocity of the UAV.

7. The UAV of claim 6, wherein the processor is further configured to execute the instructions to:
control the UAV to maintain a constant heading while controlling the UAV to move with the variable speed along the one or more directions, wherein the initial heading is the constant heading.

8. The UAV of claim 6, wherein the one or more sensors include a positioning sensor or an inertial measurement unit (IMU).

9. The UAV of claim 6, wherein the processor is further configured to execute the instructions to:
estimate an intermediate heading of the UAV; and
control the angular velocity based at least in part on at least a difference between the intermediate heading and the target direction.

10. The UAV of claim 6, wherein the processor is further configured to execute the instructions to:

control the UAV to move along the target direction.

11. The UAV of claim 10, wherein after controlling the UAV to move along its heading direction the processor is configured to execute the instructions to:
estimate a current heading of the UAV;
determine a current target direction from the UAV towards the target; and
control the angular velocity to reduce a difference between the current heading and the target direction.

12. The UAV of claim 6, wherein the processor is further configured to execute the instructions to:
compare a current movement direction of the UAV in the local coordinate system and a current movement direction of the UAV in the global coordinate system; and
determine the correspondence between the local coordinate system and the global coordinate system based on a result of the comparison.

13. A system for controlling a movable object, the system comprising:
a memory having instructions stored therein; and
an electronic control unit having a processor configured to execute the instructions to:
collect sensing data from one or more sensors onboard the movable object during movement of the movable object with a variable speed along one or more directions, without collecting data from a magnetic sensor;
determine a correspondence between a local coordinate system and a global coordinate system based on the sensing data;
determine an initial heading of the movable object based on the correspondence; and
reduce a difference between the initial heading and a target direction by controlling an angular velocity of the movable object.

14. The system of claim 13, wherein the movable object is an unmanned aerial vehicle (UAV) and the processor is further configured to execute the instructions to:
control the UAV to maintain a constant heading while controlling the UAV to move with the variable speed along the one or more directions, wherein the initial heading is the constant heading.

15. The system of claim 13, wherein the one or more sensors include a positioning sensor or an inertial measurement unit (IMU).

16. The system of claim 13, wherein the processor is further configured to execute the instructions to:
estimate an intermediate heading of the movable object; and
control the movable object based at least in part on at least a difference between the intermediate heading and the target direction.

17. The system of claim 13, wherein the processor is further configured to execute the instructions to:
compare a current movement direction of the movable object in the local coordinate system and a current movement direction of the movable object in the global coordinate system; and
determine the correspondence between the local coordinate system and the global coordinate system based on a result of the comparison.

18. The method of claim 4, wherein controlling the moveable object to move along the target direction comprises:
controlling a speed of the movable object based on a current distance of the movable object to a target and/or a location of the target and current flight directions.

19. The UAV of claim 10, wherein the processor is further configured to execute the instructions to:
    control a speed of the UAV based on a current distance of the UAV to a target, and/or based on a location of the target and current flight directions.

20. The UAV of claim 13, wherein the processor is further configured to execute the instructions to:
    control a speed of the UAV based on a current distance of the UAV to a target, and/or based on a location of the target and current flight directions.

\* \* \* \* \*